United States Patent [19]
Myers

[11] Patent Number: 5,903,919
[45] Date of Patent: May 11, 1999

[54] METHOD AND APPARATUS FOR SELECTING A REGISTER BANK

[75] Inventor: Jeffrey Van Myers, Driftwood, Tex.

[73] Assignee: Motorola, Inc., Schaumburg, Ill.

[21] Appl. No.: 08/946,148

[22] Filed: Oct. 7, 1997

[51] Int. Cl.⁶ .................................................. G06F 12/06
[52] U.S. Cl. .......................................................... 711/220
[58] Field of Search ................................... 711/220, 221

[56] References Cited

U.S. PATENT DOCUMENTS

| | | | |
|---|---|---|---|
| 5,093,783 | 3/1992 | Kitada ..................................... | 711/220 |
| 5,115,506 | 5/1992 | Cohen et al. . | |
| 5,388,239 | 2/1995 | Iimura et al. ............................ | 711/220 |
| 5,640,582 | 6/1997 | Hays et al. .......................... | 395/800.38 |
| 5,655,132 | 8/1997 | Watson ..................................... | 395/674 |
| 5,712,999 | 1/1998 | Guttag et al. ........................... | 395/516 |
| 5,737,625 | 4/1998 | Jaggar ................................. | 395/800.41 |
| 5,751,588 | 5/1998 | Fujimura ................................ | 711/220 |

OTHER PUBLICATIONS

Advanced RISC Machines Limited (ARM), ARM7TMI Data Sheet, pp. 3–5 through 3–8 and 5–13 through (1995).

Zilog Z80, pp. 5–6 and 5–33 through 5–34.

Advanced Micro Devices, AM29000 32–Bit Streamlined Instruction Processor Users Manual, pp. 3–1 through 3–4.

SPARC RISC User's Guide, pp. 2–1 through 2–6.

*Primary Examiner*—William M. Treat
*Attorney, Agent, or Firm*—Keith E. Witek

[57] ABSTRACT

Method and apparatus for selecting one of a plurality of banks of registers in a register file of a data processor. The register specifier fields of an instruction are logically combined with respective register bank specifier fields of a control register to access the register file. If register bank specifier fields are provided in the instruction, selection between these bank specifier fields and the bank specifier fields of the control register can be either direct, via a control field in the control register, or indirect, via a control field of the instruction. If the instruction includes an implied register, another register bank specifier field may be provided in the control register for use when the implied register is accessed. The register bank specifier fields, or selected portions thereof, may be made privileged.

25 Claims, 4 Drawing Sheets

METHOD AND APPARATUS FOR SELECTING A REGISTER BANK

FIELD OF THE INVENTION

The present invention relates in general to a data processor having a register file comprised of a plurality of banks, and more particularly to a method and apparatus for selecting one of the register banks.

BACKGROUND OF THE INVENTION

In general, data processors are designed to execute one or more instructions, the respective control fields of which are defined according to one or more formats. Most instructions have at least one control field for selecting among the several user-accessible resources, such as working registers, defined by the architecture of the data processor. Unless the architecture is memory-oriented, such as the Texas Instruments 9900 family of data processors, there are a limited number of such working registers. This limited amount of registers generally determines the number of bits in a register select control field sufficient to address all working registers. Thus, for example, in an architecture having only 16 working registers, 4 register select bits are sufficient to address all of the 16 working registers. Extending such an architecture to include additional working registers generally requires either a reformatting of the instructions to accommodate the additional register selection bits or some mechanism for remapping the existing register selection bits onto the extended register set. The first alternative of adding additional register selection bits is unattractive because the additional bits which must be dedicated to register selection reduce the number of available bits for specifying other control functions, such as operations, within the instruction format. In addition, any reformatting renders incompatible all pre-existing code whereby code compatibility between microprocessors in a family of processors may be lost. The second alternative has been attempted in several conventional data processors.

In the architecture of the Zilog Z80, an enhanced version of the Intel 8080, a selected subset of the working registers were duplicated, and an Exchange instruction was defined for swapping the register pairs/sets. In the Z80, at any time, one or the other set of registers, but not both, were accessible.

In the Sun Microsystems SPARC architecture, a very complicated set of 128 "overlapping" register windows was defined. The currently active portion of the window was specified in a 5-bit Current Window Pointer in the Processor Status Register. Except for certain overlapping/global portions, simultaneous access to registers in other windows was impossible.

In the Advanced Risk Machine (ARM) architecture, most 32-bit instructions include one or more 4-bit register select fields to select among the 16 general purpose registers. However, in the THUMB extension to the basic ARM architecture, the 16-bit instructions provide only 3-bit register select fields, thus restricting access to the lowest 8 of the 16 registers. To allow at least limited access to the upper 8 registers, special formats of the Add, Compare, Move, and Branch instructions have been provided, in which single-bit register select extension fields in the instruction are logically concatenated with the 3-bit register select fields to restore full 4-bit register addressing. Thus, THUMB represents a third possible compromise between register file size and instruction set robustness.

In contrast to such architectures, an attempt can be made at the time the architecture is initially defined to provide a set of working registers so large as to satisfy all reasonably anticipated applications. For example, the Advanced Micro Devices 29000 architecture defines 192 general purpose registers, of which 64 are considered global and 128 are local. For convenience, access protection was provided on a 16-register bank granularity. It should be noted, however, that, other than for purposes of access protection, all 192 of the general purpose registers comprised a single linearly addressed register file and require full 8-bit register select fields.

In view of these and other limitations in the architecture of prior art data processors, it is an object of the present invention to provide an architecture for a data processor having a register file logically partitioned into at least two register banks. The architecture including an improved method and apparatus for selecting a respective one of the banks for each register access. In particular, the present invention provides a register bank selection method and apparatus which is independent of the architecture's instruction formats.

DESCRIPTION OF THE PREFERRED EMBODIMENTS

Figure 1:
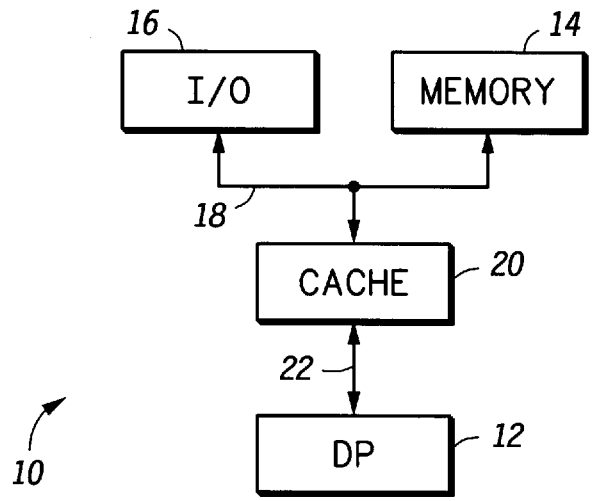
FIG. 1 illustrates, in block diagram form, a data processing system 10 constructed in accordance with the present invention.

Description of FIG. 1

FIG. 1 illustrates one embodiment of a data processing system 10, constructed in accordance with the present invention. In this embodiment, data processing system 10 includes a data processor (DP) 12, a memory 14, and an input/output (I/O) subsystem 16, which are bidirectionally coupled together by way of a system bus 18. In the preferred form, a conventional cache system 20 is coupled between the DP 12 and the system bus 18 wherein a local bus 22 couples the cache 20 to the DP 22. Therefore, the DP 22 communicates with the I/O subsystem 16 and the memory 14 through the buses 18 and 22 and the cache 20.

Figure 2:
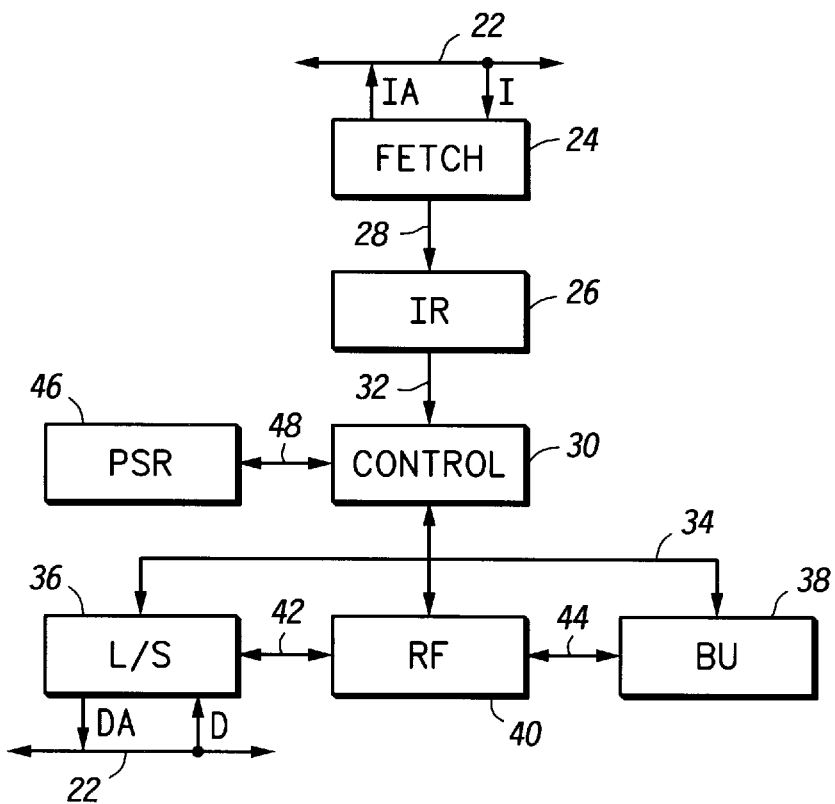
FIG. 2 illustrates, in block diagram form, a detailed preferred embodiment of the data processor 12 of FIG. 1.

Description of FIG. 2

FIG. 2 illustrates a preferred data processor (DP) 22 which may be used in the system of FIG. 1. In the preferred embodiment of the DP 12 shown in FIG. 2, fetch logic 24 provides each instruction address (I/A) via the local bus 22. In response to the instruction address (I/A), cache 20, perhaps with the cooperation of memory 14, provides the corresponding instruction (I) to the fetch unit 24 via the local bus 22. Upon receipt of the instruction (I), fetch logic 24 transfers the instruction to an instruction register (IR) 26 via a signal path 28 in FIG. 2. At a suitable time, control logic 30 receives the instruction (I) from the IR 26 via the signal path 32 and decodes the instruction (I). Depending upon the decoded instruction, control 30 dispatches, via a signal path 34, either the instruction or control signals decoded from the instruction to either a load/store unit (L/S) 36 or an execution unit (EU) 38 to enable instruction execution. In response to a dispatched instruction, L/S 36 provides a data address (DA) via the local bus 22 and cooperates with cache 20 (and, ultimately, memory 14) to transfer an operand between the memory 14 and a register file (RF) 40 using a signal path 42. In response to a dispatched instruction, EU 38 performs a selected arithmetic or logical operation on one or more operands stored in RF 40, using signal path 44. Control 30 assists both L/S 36 and EU 38 in accessing RF 40 in order to correctly perform instruction execution. In the preferred form, control 30 resolves control flow instructions and exception conditions with minimal assistance from L/S 36 and EU 38. For this purpose, control 30 may maintain certain system status information in a processor status register (PSR) 46 using a signal path 48.

Figure 3:
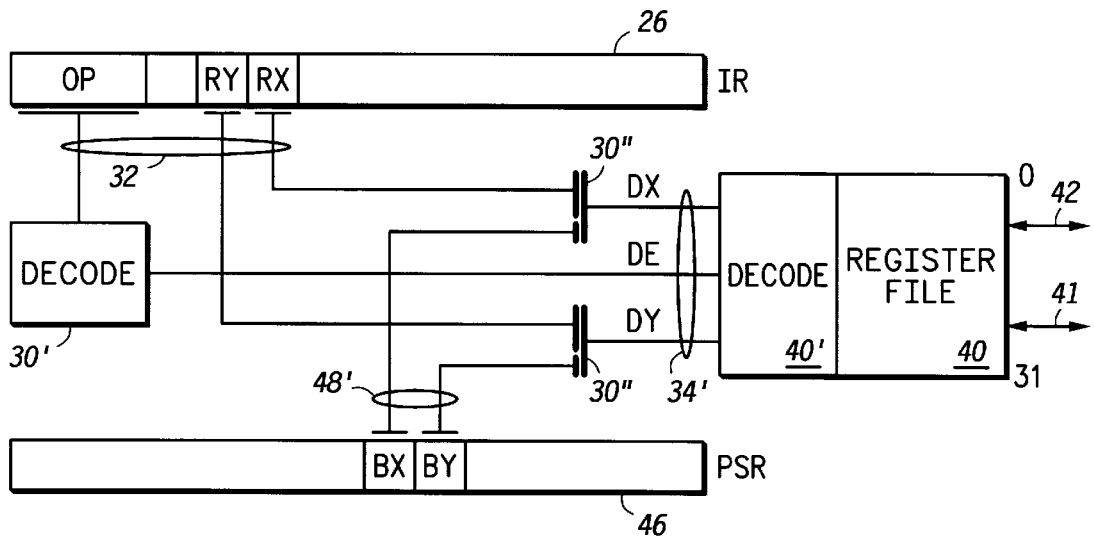
FIG. 3 illustrates, in block diagram form, one preferred instruction decode process which occurs within the data processor of FIG. 2 in accordance with the present invention.

Description of FIG. 3

As shown in FIG. 3, the IR 26 which contains fetched instructions may include, for example, an operation code (OP code) control field, a first register select (RX) control field, and a second register select (RY) control field. In such a two-operand instruction format, the OP code might request the comparison of the contents of the registers, specified by the RX and RY fields. Alternatively, the OP code might request that an arithmetic or logical operation be performed on the contents of the "source" registers specified by the RX and RY fields, with the result being returned to the "destination" register specified by the RY field. In response to detecting either of these codes in the OP code field of the IR 26, a decode logic 30' portion of the control 30 will enable a decoder portion 40' of the RF 40, via a decoder enable (DE) signal, to accept the IR 26 register select fields RX and RY via gating logic 30" in control 30. In response, the register file 40 will forward the contents of the selected source registers, RX and RY, to the EU 38, via signal path 44, and, at the appropriate time, accept back any result for storage in the selected destination register RY.

In accordance with the preferred embodiment of the present invention, PSR 46 includes, for example, a first register bank select (BX) control field and a second register bank select (BY) control field. In response to the DE signal, decoder 40' also accepts, via gating logic 30", the register bank select fields, BX and BY, as logical extensions of the register select fields, RX and RY, respectively. In other words, the BX and BY locations within the PSR 46 contain n bits wherein n is a finite positive integer greater than zero. The system stores n bank select bits into each BX and BY within the PSR 46 before instruction execution. During instruction execution, m bits from each of the locations RY and RX are provided where m is a finite positive integer greater than one. The m bits from each of RX and RY along with the n bits from each of BX and BY are respectively provided to switching logic 30" of FIG. 3. This logic 30" then provides a concatenation of these n and m bits wherein DX is the concatenation of BX and RX and DY is the concatenation of BY and RY.

Figure 4:
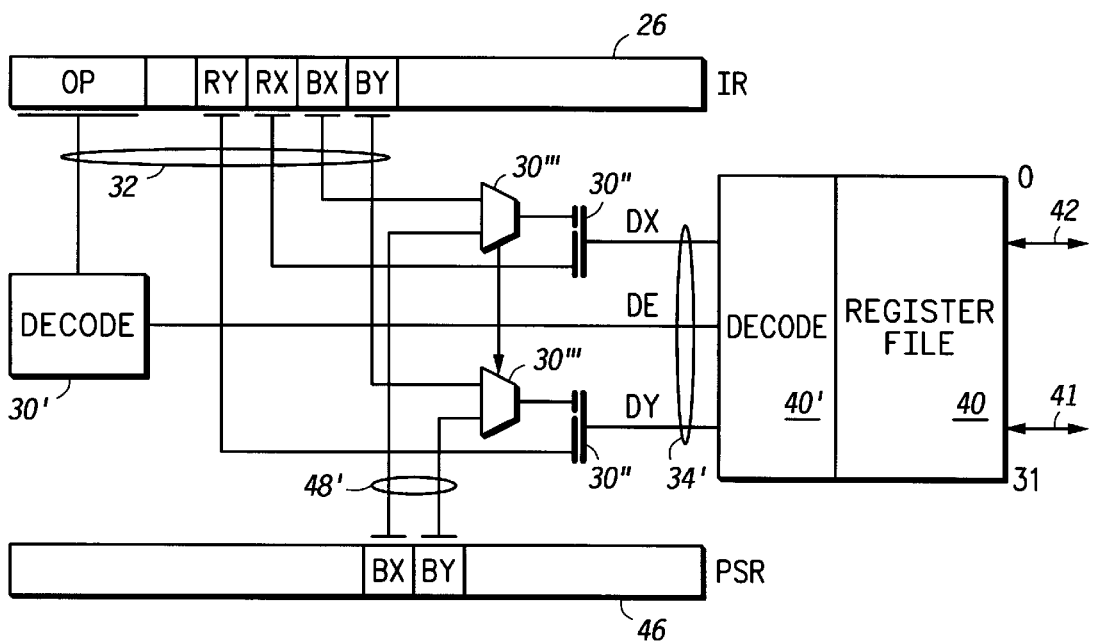
FIG. 4 illustrates, in block diagram form, another preferred instruction decode process of the present invention in which alternate register bank selection mechanisms can be enabled as a side effect of the instruction operation code in accordance with the present invention.

Description of FIG. 4

Shown in FIG. 4 is another preferred form of the present invention. In this illustrated embodiment, the IR 26 is shown as containing an instruction having a format which includes register bank select control fields, BX and BY. In response to decoding an OP code having this format, decode 30' will enable, via the DE signal, a pair of multiplexors 30'" in control 30 to forward the BX and BY fields from the IR 26 to the gating logic 30", rather than the PSR 46 BX and BY fields. In accordance with this embodiment of the present invention, selection between the IR 26 BX/BY fields and the PSR 26 BX/BY fields is on the basis of the IR 26 OP code field.

Figure 5:
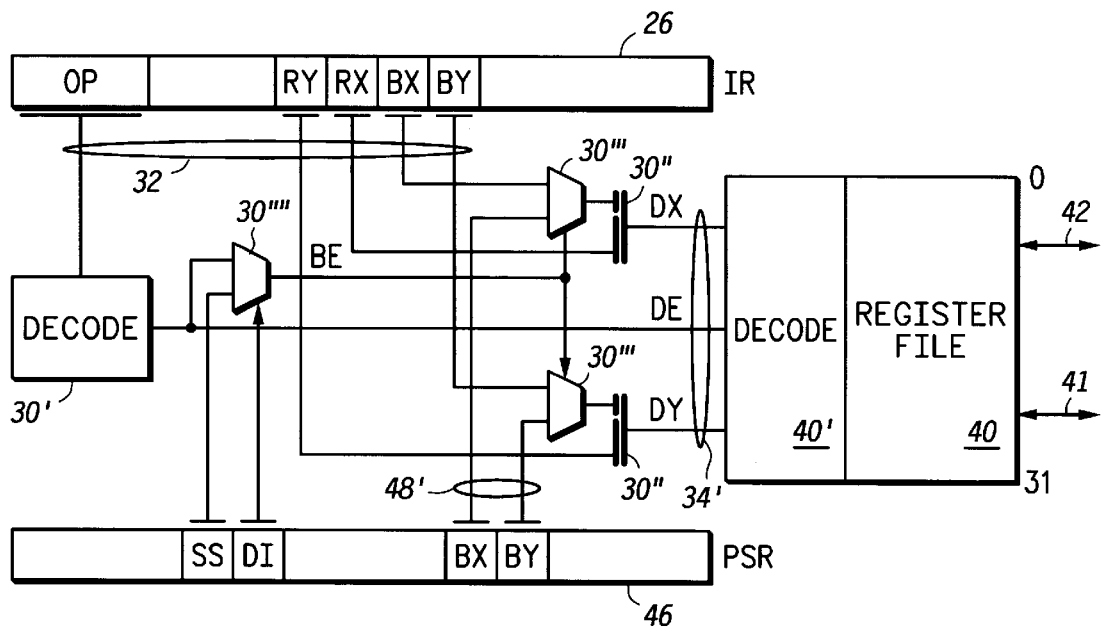
FIG. 5 illustrates, in block diagram form, yet another preferred instruction decode process of the present invention in which alternate register bank selection mechanisms can be enabled directly or as a side effect of the instruction operation code in accordance with the present invention.

Description of FIG. 5

Shown in FIG. 5 is yet another preferred form of the present invention. As in the embodiment shown in FIG. 4, the IR 26 of FIG. 5 contains an instruction having a format which includes register bank select control fields, BX and BY. In addition, however, the PSR 46 is shown as containing a source select (SS) control field and a direct/indirect (DI) control field. Depending upon the value of the DI field in PSR 46, a multiplexor 30"" within control logic 30 will forward to the gating logic 30", as a bank enable (BE) signal, either the DE signal or the SS field of PSR 46. In accordance with this embodiment of the present invention, selection between the OP code field of the IR 26 and the SS field of the PSR 46 as the source of the BX and BY sources, is on the basis of the DI field of the PSR 46. Thus, for example, by setting the DI bit of the PSR 46, the programmer can directly control the source of the BX and BY fields via the SS field of the PSR 46; resetting the DI bit of the PSR 46 allows the source selection to be done indirectly via the OP code field of the IR 26.

If desired, the DI field of the PSR 46 may be eliminated, allowing the SS field of the PSR 46 to directly select the source of the BX/BY fields. Alternatively, the DI field of the PSR 46 may be more broadly defined to control other aspects of the architecture, such as instruction length or operating mode, in which case the control of the multiplexor 30"" could be considered an indirect or side effect.

Figure 6:
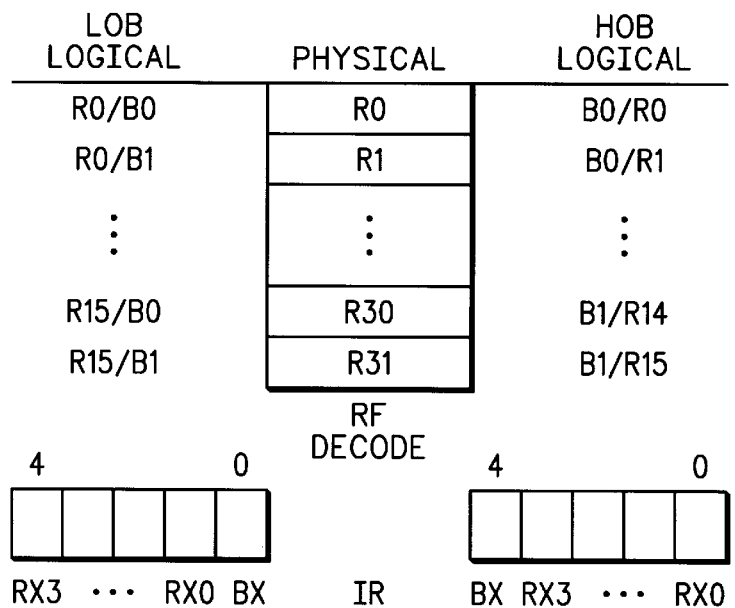
FIG. 6 illustrates, in block diagram form, two alternative logical-to-physical register mappings, either of which may be advantageously employed in any of the preferred embodiments in accordance with the present invention.

Description of FIG. 6

Shown in FIG. 6 are two alternative logical-to-physical register mappings, either of which may be advantageously employed in the preferred embodiments shown in FIG. 3, FIG. 4 and FIG. 5. In the illustrated embodiment, the RX and RY fields are assumed to each consist of 4 bits, and the BX and BY fields are assumed to each consist of 1 bit. Logically concatenating the RX and RY fields with the corresponding BX and BY fields creates effective decode control fields, DX and DY, respectively, each consisting of 5 bits. With 5-bit DX and DY fields, RF 40 can contain 32, independently addressable, registers, R0–R31. Thus, in accordance with the present invention, the register addressing range can be expanded without reducing the number of bits in the instruction format available for other control purposes. In particular, the present invention allows each of the register selection fields defined in a particular instruction format to be expanded independent of each other.

As shown in FIG. 6, each of the registers R0–R31 can be selected using either a low-order-bank (LOB) or high-order-bank (HOB) concatenation scheme. The preferred embodiment shown in FIG. 3 has the logic gates 30" configured to implement the LOB scheme, while the preferred embodiments shown in FIG. 4 and FIG. 5 have the logic gates 30" configured to implement the HOB scheme. Of course, other numbers and sizes of the several control fields may be used just as advantageously in the present invention.

At reset, the BX and BY fields of PSR 46 will be initialized to predetermined values, say zero (0). Upon initiating operation, the data processor 10 will thus be using register bank 0 for all register accesses. Subsequently, an instruction may load particular values into the BX and BY fields of PSR 46. Thereafter, the RX and/or RY fields of all instructions will be logically extended in accordance with the values in the BX and BY fields of PSR 46. At appropriate times, other instructions can modify the values in the BX and/or BY fields of PSR 46. Of particular importance, the present invention allows the RX and RY register accesses to be independently directed to any of the available register banks in the RF 40.

Figure 7:
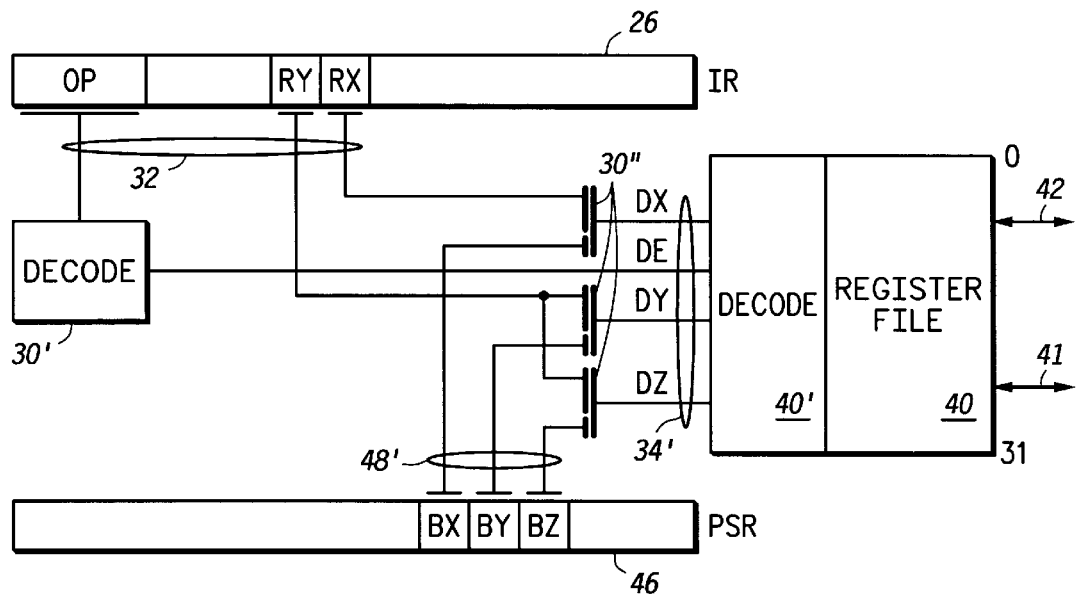
FIG. 7 illustrates, in block diagram form, one other preferred instruction decode process of the present invention in which the bank containing the register selected to receive a result during a writeback cycle is independent selected in accordance with the present invention.
Figure 8:
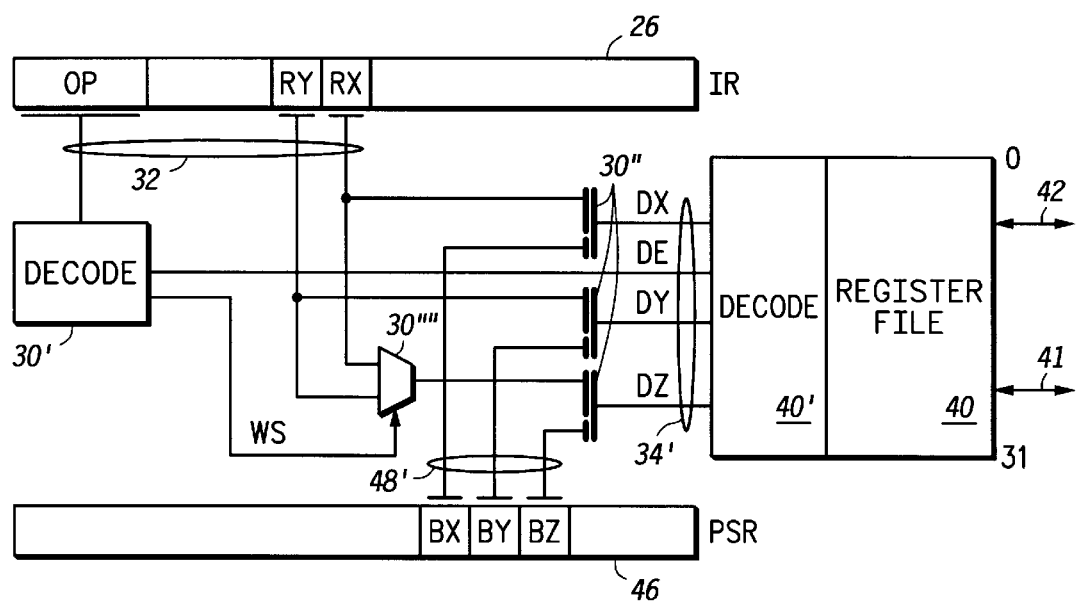
FIG. 8 illustrates, in block diagram form, still another preferred instruction decode process of the present invention in which the source of the result register select field is determined as a side effect of the instruction operation code in accordance with the present invention.

Description of FIG. 7 and FIG. 8

Shown in FIG. 7 is one other preferred form of the present invention. In the illustrated embodiment, the PSR 46 is shown as containing a third register bank select (BZ) control field. During the writeback cycle of an instruction, the contents of the BZ field of the PSR 46 are forwarded to the decode portion 40' of RF 40, via a third set of gating logic 30" in control logic 30", together with the register bank select field BY. Thus, any result of the operation specified in the OP code field in the IR 26 is stored in the RY register in the BZ bank of RF 40. In accordance with this embodiment of the present invention, the bank selection for the RY source operand and the bank selection for the RY result operand are independent, both from each other and from the OP code field in the IR 26.

If, for whatever reason, a particular operation is defined such that the result is be delivered back to the RF 40 in the RX register rather than the RY register, the embodiment shown in FIG. 7 may be easily modified as shown in FIG. 8 to include a multiplexor 30"" in control logic 30, responsive to a writeback select WS signal from decode 30', to selectively gate either the IR 26 RX field or the IR 26 RY field to the gating logic 30" during the writeback cycle.

OTHER EMBODIMENTS

Although the present invention has been described herein in the context of several preferred embodiments, various modifications may be made without departing from the spirit and scope of the invention. For example, the dyadic (two-operand) instruction formats shown in FIGS. 3, 4, 5, 7 and 8 can be easily extended to other instruction formats, such as monadic (one-operand) or triadic (three-operand). Similarly, the OP code field of the IR 26 shown in FIGS. 3, 4, 5, 7 and 8 may take various forms. Of course, the various control fields described herein may be defined in control registers other than the PSR 46, and need not be contained in the same control register.

In a data processor having privilege levels, such as user and supervisor, it may be desirable to reserve the right to modify the contents of the register bank select fields in the PSR 46 to programs executing at the supervisor level. This feature may be extended to a data processor in which the register file is logically partitioned into more than two banks, thus requiring the bank select fields to be comprised of more than one bit. In such an embodiment, it may be advantageous to restrict the privilege to only a particular portion of the register bank select fields, such as the upper bit(s), effectively subsetting the set of available banks. Within the particular subsets selected by the privileged portion of the register bank select fields, programs executing at the user level would be able to independently modify each register bank select field to select a particular one of the banks in the respective subset. If desired, a single register bank select extension field, privileged or non-privileged, could be provided and made applicable to all of register bank select fields, thus limiting all single-instruction accesses to the same subset of banks in the RF 40. Many other variations and modifications of the present invention will be evident to those skilled in the art of data processors and their architectures.

What I claim is:

1. A data processor comprising:
    a register file having a plurality of registers, logically partitioned into first and second register banks;
    a control register having a first register bank specifier field for specifying a first one of said register banks, and a second register bank specifier field for specifying a second one of said register banks;
    an instruction register having a first register specifier field for specifying, in said first specified register bank, a first one of said registers, and a second register specifier field for specifying, in said second specified register bank, a second one of said registers; and
    a register selector, coupled to said register file, said control register and said instruction register, to select said first specified register in said first specified register bank and said second specified register in said second specified register bank.

2. The data processor of claim 1 wherein:
    the instruction register also has a third register bank specifier field for specifying a third one of said register banks, and a fourth register bank specifier field for specifying a fourth one of said register banks; and
    the register selector selects said first specified register in a predetermined one of said first and third specified register banks and said second specified register in a predetermined one of said second and fourth specified register banks.

3. The data processor of claim 2 wherein:
    the instruction register also has a first control field for specifying one of said control register or said instruction register; and
    the register selector selects said first and second specified registers in said first and second specified register banks, respectively, in response to said first control field specifying said control register, and in said third and fourth specified register banks, respectively, in response to said first control field specifying said instruction register.

4. The data processor of claim 3 wherein said first control field indirectly specifies said one of said control and instruction registers.

5. The data processor of claim 2 wherein:

the control register also has a first control field for specifying one of said control and said instruction registers; and the register selector selects said first and second specified registers in said first and second specified register banks, respectively, in response to said first control field specifying said control register, and in said third and fourth specified register banks, respectively, in response to said first control field specifying said instruction register.

6. The data processor of claim 5 wherein said first control field indirectly specifies said one of said control and instruction registers.

7. The data processor of claim 1 wherein:

the control register also has a third register bank specifier field for specifying a third one of said register banks, the instruction register also has a third register specifier field for specifying, in said third specified register bank, a third one of said registers; and the register selector also selects said third specified register in said third specified register bank.

8. The data processor of claim 7 wherein:

the instruction register also has a fourth register bank specifier field for specifying a fourth one of said register banks, a fifth register bank specifier field for specifying a fifth one of said register banks, and a sixth register bank specifier field for specifying a sixth one of said register banks; and the register selector selects said first specified register in a predetermined one of said first and fourth specified register banks, said second specified register in a predetermined one of said second and fifth specified register banks, and said third specified register in a predetermined one of said third and sixth specified register banks.

9. The data processor of claim 8 wherein:

the instruction register also has a first control field for specifying one of said control register or said instruction register; and the register selector selects said first, second and third specified registers in said first, second and third specified register banks, respectively, in response to said first control field specifying said control register, and in said fourth, fifth and sixth specified register banks, respectively, in response to said first control field specifying said instruction register.

10. The data processor of claim 9 wherein said first control field indirectly specifies said one of said control and instruction registers.

11. The data processor of claim 8 wherein:

the control register also has a first control field for specifying one of said control and said instruction registers; and the register selector selects said first, second and third specified registers in said first, second and third specified register banks, respectively, in response to said first control field specifying said control register, and in said fourth, fifth and sixth specified register banks, respectively, in response to said first control field specifying said instruction register.

12. The data processor of claim 11 wherein said first control field indirectly specifies said one of said control and instruction registers.

13. The data processor of claim 1 wherein:

the control register also has a third register bank specifier field for specifying a third one of said register banks, and the register selector also selects a predetermined one of said first and second specified registers in said third specified register bank.

14. The data processor of claim 13 wherein:

the instruction register also has a first control field for specifying one of said first and second register specifier fields; and the register selector selects said first specified register in said third specified register bank, in response to said first control field specifying said first register specifier field, and said second specified register in said third specified register bank, in response to said first control field specifying said second register specifier field.

15. The data processor of claim 14 wherein said first control field indirectly specifies said one of said first and second register specifier fields.

16. The data processor of claim 13 wherein:

the control register also has a first control field for specifying one of said first and second register specifier fields; and the register selector selects said first specified register in said third specified register bank, in response to said first control field specifying said first register specifier field, and said second specified register in said third specified register bank, in response to said first control field specifying said second register specifier field.

17. The data processor of claim 16 wherein said first control field indirectly specifies said one of said first and second register specifier fields.

18. The data processor of claim 1 wherein the data processor has first and second privilege levels, and wherein said first and second register bank select fields are protected from modification when the data processor is in the first privilege level.

19. The data processor of claim 1 wherein the data processor has first and second privilege levels, and wherein said first and second register bank select fields are each comprised of a first portion and a second portion, the first portion being protected from modification when the data processor is in the first privilege level.

20. The data processor of claim 1 wherein the register file is logically partitioned into a plurality of subsets of register banks, wherein the control register has a register bank subset select field for selecting one of said subsets of register banks, and wherein the register selector selects said first specified register in said first specified register bank in said one selected subset of register banks and said second specified register in said second specified register bank in said one selected subset of register banks.

21. A data processor comprising:

a register file having a plurality of registers, logically partitioned into first and second register banks; p1 a control register having a first register bank specifier field for specifying a first one of said register banks, a second register bank specifier field for specifying a second one of said register banks, and a third register bank specifier field for specifying a third one of said register banks;

an instruction register having a first register specifier field for specifying, in said first specified register bank, a first one of said registers, and a second register specifier field for specifying, in said second specified register bank, a second one of said registers; and a register selector, coupled to said register file, said control register and said instruction register, to select said first specified register in said first specified register bank, said second specified register in said second specified register bank, and a predetermined one of said first and second specified registers in said third specified register bank.

22. In a data processor having a plurality of registers logically partitioned into $2^n$ sets of $2^m$ registers, an instruction of said data processor having a first and second register specifiers for selecting respective ones of said $2^m$ registers in a register set, the method comprising the steps of:

storing first and second extension specifiers for selecting respective ones of said $2^n$ register sets;

combining said first register specifier and said first extension specifier to form a first register selector, and said second register specifier and said second extension specifier to form a second register selector; and accessing, during the execution of said instruction, registers in said register file corresponding to said first and second register selectors.

23. The method of claim 22 wherein the step of combining is further characterized as concatenating the register specifiers and the extension specifiers.

24. The method of claim 23 wherein the extension specifier is concatenated to a low order portion of the register specifier.

25. The method of claim 23 wherein the extension specifier is concatenated to a high order portion of the register specifier.

* * * * *